United States Patent
Nakahara

(10) Patent No.: US 10,623,449 B2
(45) Date of Patent: Apr. 14, 2020

(54) COMMUNICATION MEDIATION SYSTEM, COMMUNICATION MEDIATION DEVICE, COMMUNICATION MEDIATION METHOD, AND COMMUNICATION MEDIATION PROGRAM

(71) Applicant: KONICA MINOLTA, INC., Chiyoda-ku, Tokyo (JP)

(72) Inventor: Kei Nakahara, Suita (JP)

(73) Assignee: KONICA MINOLTA, INC., Tokyo (JP)

( * ) Notice: Subject to any disclaimer, the term of this patent is extended or adjusted under 35 U.S.C. 154(b) by 380 days.

(21) Appl. No.: 15/046,057

(22) Filed: Feb. 17, 2016

(65) Prior Publication Data

US 2016/0248816 A1    Aug. 25, 2016

(30) Foreign Application Priority Data

Feb. 24, 2015    (JP) ................. 2015-034247

(51) Int. Cl.
*H04L 29/06*    (2006.01)

(52) U.S. Cl.
CPC .......... *H04L 65/1066* (2013.01); *H04L 63/10* (2013.01)

(58) Field of Classification Search
CPC ........................... H04L 63/10; H04L 65/1066
See application file for complete search history.

(56) References Cited

U.S. PATENT DOCUMENTS

| | | | |
|---|---|---|---|
| 7,778,193 B2 | 8/2010 | Mizuno et al. | |
| 2006/0280127 A1* | 12/2006 | Mizuno ................. | H04L 12/281 370/254 |
| 2008/0009266 A1* | 1/2008 | Yamasaki ........... | H04L 63/1408 455/411 |
| 2008/0189774 A1* | 8/2008 | Ansari ................... | G06Q 30/04 726/7 |
| 2011/0063994 A1* | 3/2011 | Nix ...................... | H04B 5/0037 370/254 |

(Continued)

FOREIGN PATENT DOCUMENTS

| | | |
|---|---|---|
| JP | 2014032597 A | 2/2014 |
| JP | 2014215846 A | 11/2014 |
| WO | 2005122492 A1 | 12/2005 |

OTHER PUBLICATIONS

Japanese Office Action (and English translation thereof) dated Mar. 7, 2017, issued in counterpart Japanese Application No. 2015-034247.

*Primary Examiner* — Joe Chacko
(74) *Attorney, Agent, or Firm* — Holtz, Holtz & Volek PC

(57) ABSTRACT

A management device connected to the Internet, includes: a first transmitting unit configured to transmit setting information necessary for mediating communication from the Internet to at least one terminal device connected to a LAN, to a communication mediation device connected to the LAN; and a storage unit configured to store determining information for determining whether the communication mediation device has been connected to an appropriate LAN, with identifying information of a predetermined terminal in the at least one terminal device connected to the LAN, wherein the first transmitting unit transmits the setting information in a case where it has been determined that the communication mediation device has been connected to the appropriate LAN.

10 Claims, 12 Drawing Sheets

(56) References Cited

U.S. PATENT DOCUMENTS

| | | | |
|---|---|---|---|
| 2013/0254367 A1* | 9/2013 | Nakajima | H04L 41/00 709/223 |
| 2014/0040425 A1* | 2/2014 | Nakazawa | H04L 67/02 709/217 |
| 2014/0268236 A1* | 9/2014 | Ohara | G06F 3/1224 358/1.15 |
| 2014/0324949 A1* | 10/2014 | Satomi | H04L 65/1069 709/203 |
| 2016/0055469 A1* | 2/2016 | Kim | H04L 41/12 705/21 |
| 2016/0337945 A1* | 11/2016 | Watt | H04W 76/10 |

* cited by examiner

COMMUNICATION MEDIATION SYSTEM, COMMUNICATION MEDIATION DEVICE, COMMUNICATION MEDIATION METHOD, AND COMMUNICATION MEDIATION PROGRAM

The entire disclosure of Japanese Patent Application No. 2015-034247 filed on Feb. 24, 2015 including description, claims, drawings, and abstract are incorporated herein by reference in its entirety.

BACKGROUND OF THE INVENTION

Field of the Invention

The present invention relates to a communication mediation system, a communication mediation device, a communication mediation method, and a communication mediation program. More specifically, the invention relates to a technique that securely introduces the communication mediation device with less time and labor.

Description of the Related Art

Recently, an application service (hereinafter referred to as "App service") in which, for example, a server of an application service provider (ASP) distributes news to devices such as personal computers connected to a local area network (LAN) via the Internet, has become widespread.

However, in a case where a LAN is connected to the Internet, a firewall is typically used so as to eliminate an unauthorized access due to a reason of network security. In particular, access from the side of the Internet to the side of the LAN is strictly restricted. Therefore, access of a server that provides the App service (hereinafter referred to as "App server") to devices on the side of the LAN is also restricted.

In order to solve the above problem, for example, a technique illustrated in FIG. 14 has been proposed (for example, refer to JP 2014-032597 A and JP 2014-215846 A). That is, a gateway 1450 connected to a LAN 1460 and a continuous connection server 1410 connected to the Internet 1430 are continuously connected to each other.

When an App server 1420 requests the continuous connection server 1410 to connect the App server 1420 to a device that has been connected to the LAN 1460, for example, a multi-function peripheral (MFP) 1470, the continuous connection server 1410 requests the gateway 1450 to mediate communication between the App server 1420 and the MFP 1470.

The gateway 1450 that has received the request, establishes a tunneling route between the App server 1420 and the MFP 1470. Then, the App server 1420 provides the MFP 1470 with the App service via the tunneling route.

As described above, the App server 1420 avoids an access restriction due to the firewall 1440 so as to provide the device on the side of the LAN with the App service.

In the related art, when the above gateway 1450 is connected to the LAN 1460, a customer management server 1400 that has been connected to the Internet 1430, is used so as to perform the following setup operation.

First, an administrator of the customer management server 1400 registers a tenant ID for specifying a user of the gateway 1450, in the customer management server 1400 and also notifies the user of the tenant ID. The user that has been notified transmits the tenant ID to the customer management server 1400 so as to acquire an activation key valid only one time. The activation key is information for proving that the tenant ID has been given based on a legal contract.

Furthermore, when the user connects the gateway 1450 to the LAN 1460 and sets the tenant ID and the activation key, the gateway 1450 transmits the tenant ID and the activation key to the customer management server 1400. When determining that the tenant ID is legal based on a combination of the tenant ID and the activation key, the customer management server 1400 returns authentication information (for example, ID and password) to the gateway 1450. The authentication information is used so that the gateway 1450 is continuously connected to the continuous connection server 1410.

However, the tenant ID and the activation key are sent to the user by an electronic mail or a mail. Therefore, the tenant ID and the activation key may be leaked out to a third party. The tenant ID and the activation key may be used only between the gateway 1450 and the customer management server 1400, and are not necessarily well known to the user.

Upon a setup of an individual gateway 1450, if there is no need for setting the tenant ID and the activation key, time and labor necessary for the setup can be omitted.

SUMMARY OF THE INVENTION

The present invention has been made in consideration of the above problem, and an object thereof is to provide a communication mediation system, a communication mediation device, a communication mediation method, and a communication mediation program that protect security accompanied with a setup and reduce time and labor for the setup.

To achieve the abovementioned object, according to an aspect, a management device connected to the Internet reflecting one aspect of the present invention comprises: a first transmitting unit configured to transmit setting information necessary for mediating communication from the Internet to at least one terminal device connected to a LAN, to a communication mediation device connected to the LAN; and a storage unit configured to store determining information for determining whether the communication mediation device has been connected to an appropriate LAN, with identifying information of a predetermined terminal in the at least one terminal device connected to the LAN, wherein the first transmitting unit transmits the setting information in a case where it has been determined that the communication mediation device has been connected to the appropriate LAN.

To achieve the abovementioned object, according to an aspect, a non-transitory recording medium storing a computer readable program, reflecting one aspect of the present invention, causes a computer of a management device connected to the Internet and comprising a storage unit configured to store determining information for determining whether a communication mediation device connected to a LAN has been connected to an appropriate LAN with identifying information of a predetermined terminal device in at least one terminal device connected to the LAN, to execute: transmitting a setting information necessary for mediating communication from the Internet to the at least one terminal device, to the communication mediation device in a case where it has been determined that the communication mediation device has been connected to the appropriate LAN.

To achieve the abovementioned object, according to an aspect, a communication mediation device connected to a LAN and configured to mediate communication from the Internet to at least one terminal device connected to the LAN, the communication mediation device reflecting one aspect of the present invention comprises: a first receiving unit configured to receive setting information necessary for mediating the communication from the Internet to the at least one terminal device, from a management device connected to the Internet; an acquisition unit configured to acquire identifying information of a predetermined terminal device in the at least one terminal device connected to the LAN; a second receiving unit configured to receive determining information for determining whether the communication mediation device has been connected to an appropriate LAN; a determining unit configured to determine whether the communication mediation device has been connected to the appropriate LAN, based on the identifying information and the determining information; and a notifying unit configured to notify the management device that it has been determined that the communication mediation device has been connected to the appropriate LAN.

To achieve the abovementioned object, according to an aspect, a non-transitory recording medium storing a computer readable program, reflecting one aspect of the present invention, causes a computer of a communication mediation device connected to a LAN and configured to mediate communication from the Internet to at least one terminal device connected to the LAN, to execute: receiving setting information necessary for mediating the communication from the Internet to the at least one terminal device, from a management device connected to the Internet; acquiring identifying information of a predetermined terminal device in the at least one terminal device connected to the LAN; receiving determining information for determining whether the communication mediation device has been connected to an appropriate LAN; determining whether the communication mediation device has been connected to the appropriate LAN, based on the identifying information and the determining information; and notifying the management device that it has been determined that the communication mediation device has been connected to the appropriate LAN.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, a communication mediation system, a communication mediation device, a communication mediation method, and a communication mediation program according to embodiments of the present invention will be described with reference to the drawings. However, the scope of the invention is not limited to the illustrated examples.

[1] First Embodiment (1) Configuration of Communication Mediation System

First, a configuration of the communication mediation system will be described.

Figure 1:
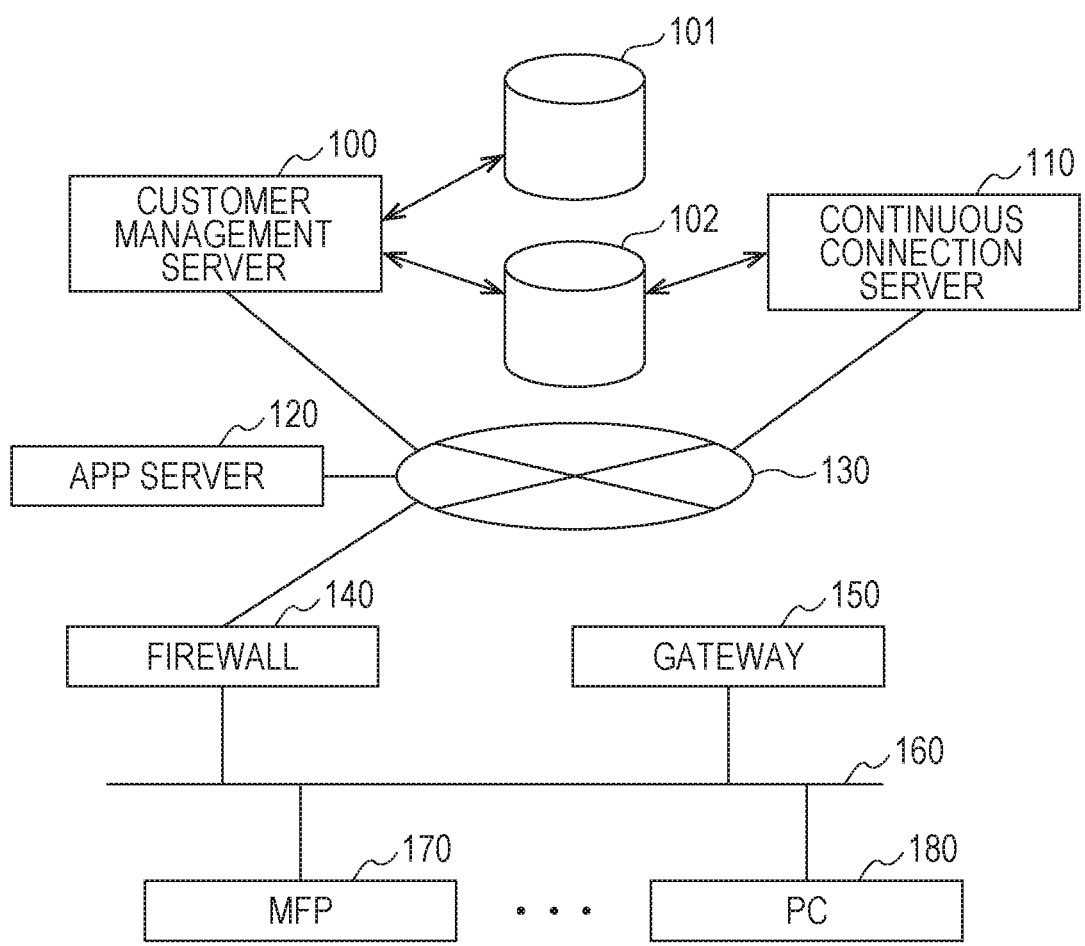
FIG. 1 is an exemplary diagram of a configuration of a communication mediation system according to a first embodiment.

As illustrated in FIG. 1, in the communication mediation system 1, a customer management server 100, a continuous connection server 110, and an App server 120 have been connected to the Internet 130 in a network configuration in which a LAN 160 has been connected to the Internet 130 via a firewall 140. A gateway 150, an MFP 170, and a personal computer (PC) 180 have been connected to the LAN 160. Note that, the firewall 140 also serves as a router for performing communication between the Internet 130 and the LAN 160.

The customer management server 100 can access both a sales management database (hereinafter referred to as "sales management DB") 101 and a connection management database (hereinafter referred to as "connection management DB") 102. The continuous connection server 110 can access only the connection management DB 102. The gateway 150 establishes a tunneling route between the continuous connection server 110 and the MFP 170 so that communication from the continuous connection server 110 to the MFP 170 can be performed.

(2) Configurations and Operation of Gateway 150

Next, configurations and operation of the gateway 150 will be described.
(2-1) Hardware Configuration First, a hardware configuration of the gateway 150 will be described.

Figure 2:
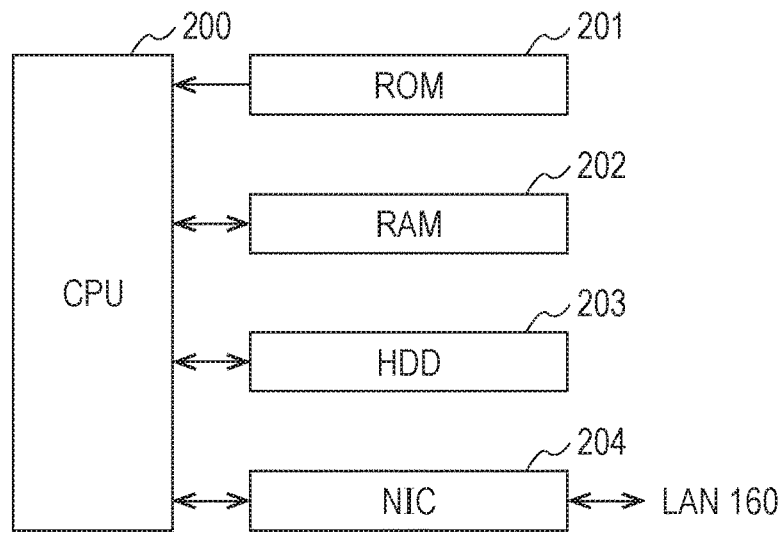
FIG. 2 is an exemplary block diagram of a main hardware configuration of a gateway.

As illustrated in FIG. 2, the gateway 150 includes, for example, a central processing unit (CPU) 200, a read only memory (ROM) 201, and a random access memory (RAM) 202. When power is supplied to the gateway 150, the CPU 200 reads a boot program from the ROM 201 so as to boot. After that, the CPU 200 reads an operating system (OS) and a setup program from a hard disk drive (HDD) 203 so as to perform setup processing.

In this case, the gateway 150 uses a network interface card (NIC) 204 so as to communicate with other devices via the LAN 160. Note that, according to the present embodiment, setting information necessary for connecting the gateway 150 to the LAN 160 has been previously stored in the HDD 203. The setting information may be set upon a setup of the gateway 150. Upon the setup, automatically reading the setting information connects the gateway 150 to the LAN 160.

(2-2) Functional Configuration

Next, a functional configuration of the gateway 150 will be described by particularly focusing on the setup processing.

Figure 3:
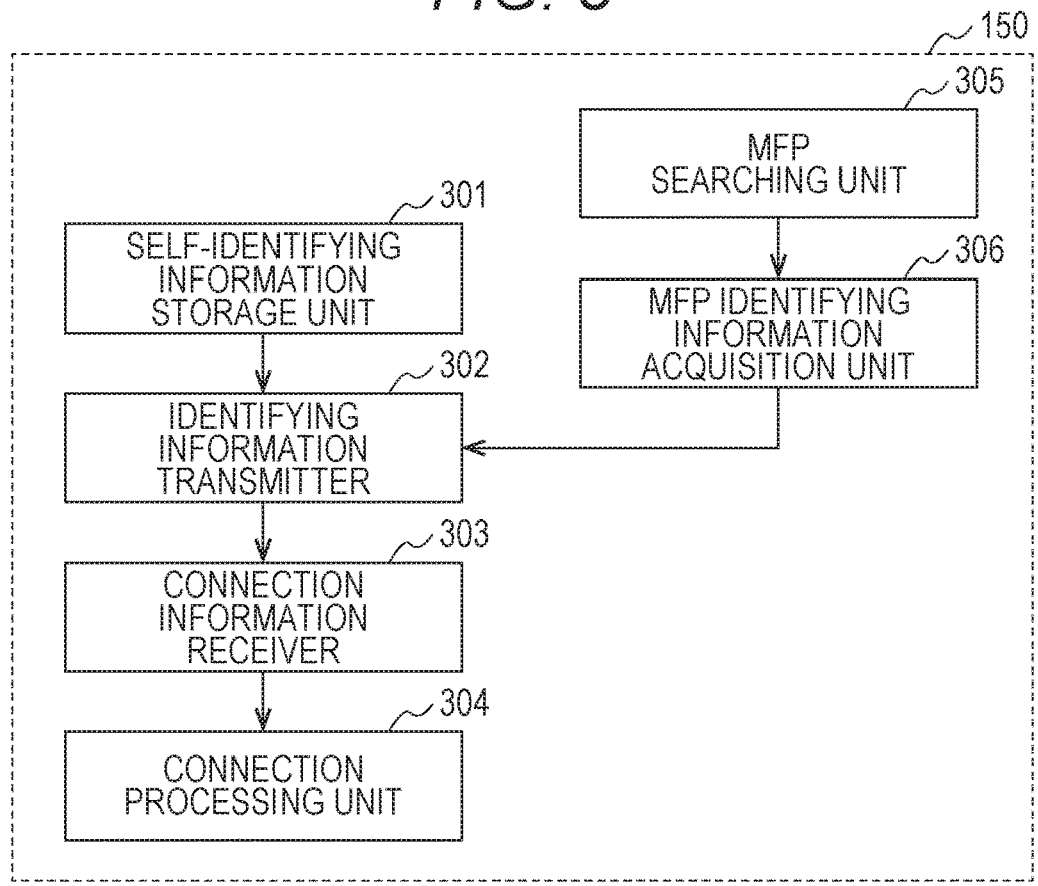
FIG. 3 is an exemplary block diagram of a functional configuration of the gateway.

As illustrated in FIG. 3, the gateway 150 includes functions, such as a self-identifying information storage unit 301 and an identifying information transmitter 302. The self-identifying information storage unit 301 stores identifying information of the gateway 150 itself in the ROM 201 or the HDD 203. According to the present embodiment, the identifying information includes a product number for identifying a model of the gateway 150 and a serial number for identifying each of products of the same model.

An MFP searching unit 305 searches whether the MFP 170 has been connected to the LAN 160. A range of the LAN 160 has been previously set in the MFP searching unit 305, the range in which the MFP 170 is searched. For example, Ping is used so as to detect all devices connected to the LAN 160.

For example, a network address is designated so that the range to be searched of the LAN 160 is set. The range may be designated by a net mask or a default gateway. The range to be searched of the LAN 160 may be spread over a plurality of network segments having different network addresses.

After detecting all of the devices connected to the LAN 160, the MFP searching unit 305 uses a simple network management protocol (SNMP) and acquires manufacturer information from each of the devices. Thus, it can be confirmed whether each of the devices is applicable to an object with identifying information to be acquired.

The MFP identifying information acquisition unit 306 acquires the identifying information from the MFP 170 detected by the MFP searching unit 305. In this case, the SNMP may be used or a special procedure may be used between the gateway 150 and the MFP 170 so as to acquire the identifying information of the MFP 170.

The identifying information transmitter 302 transmits the identifying information of the gateway 150 itself and the identifying information of the MFP 170 to the customer management server 100, the identifying information of the gateway 150 itself, having been stored in the self-identifying information storage unit 301, and the identifying information of the MFP 170, being acquired by the MFP identifying information acquisition unit 306.

The connection information receiver 303 receives connection information necessary for continuously connecting with the continuous connection server 110, from the customer management server 100. According to the present embodiment, the connection information receiver 303 receives, as the connection information, the tenant ID for identifying the gateway 150, a universal resource locater (URL) for connecting with the App server 120, and an identifier (ID) and a password for logging in the continuous connection server 110.

A connection processing unit 304 uses the connection information that has been received by the connection information receiver 303 from the customer management server 100, and logs in the continuous connection server 110 so as to perform the continuous connection. When receiving a request for starting communication with the App server 120 from the continuous connection server 110, the connection processing unit 304 uses the URL that has been received as the connection information, so as to establish a tunneling route between the App server 120 and the MFP 170.

Note that, for example, an extensible messaging and presence protocol (XMPP) can be used in the continuous connection between the gateway 150 and the continuous connection server 110. A tunneling connection between the App server 120 and the MFP 170 may be, for example, a hypertext transfer protocol (HTTP) or a secure shell (SSH).

(2-3) Setup Processing

Next, setup processing of the gateway 150 will be described. The above setup program is executed so that the setup processing is performed.

Figure 4:
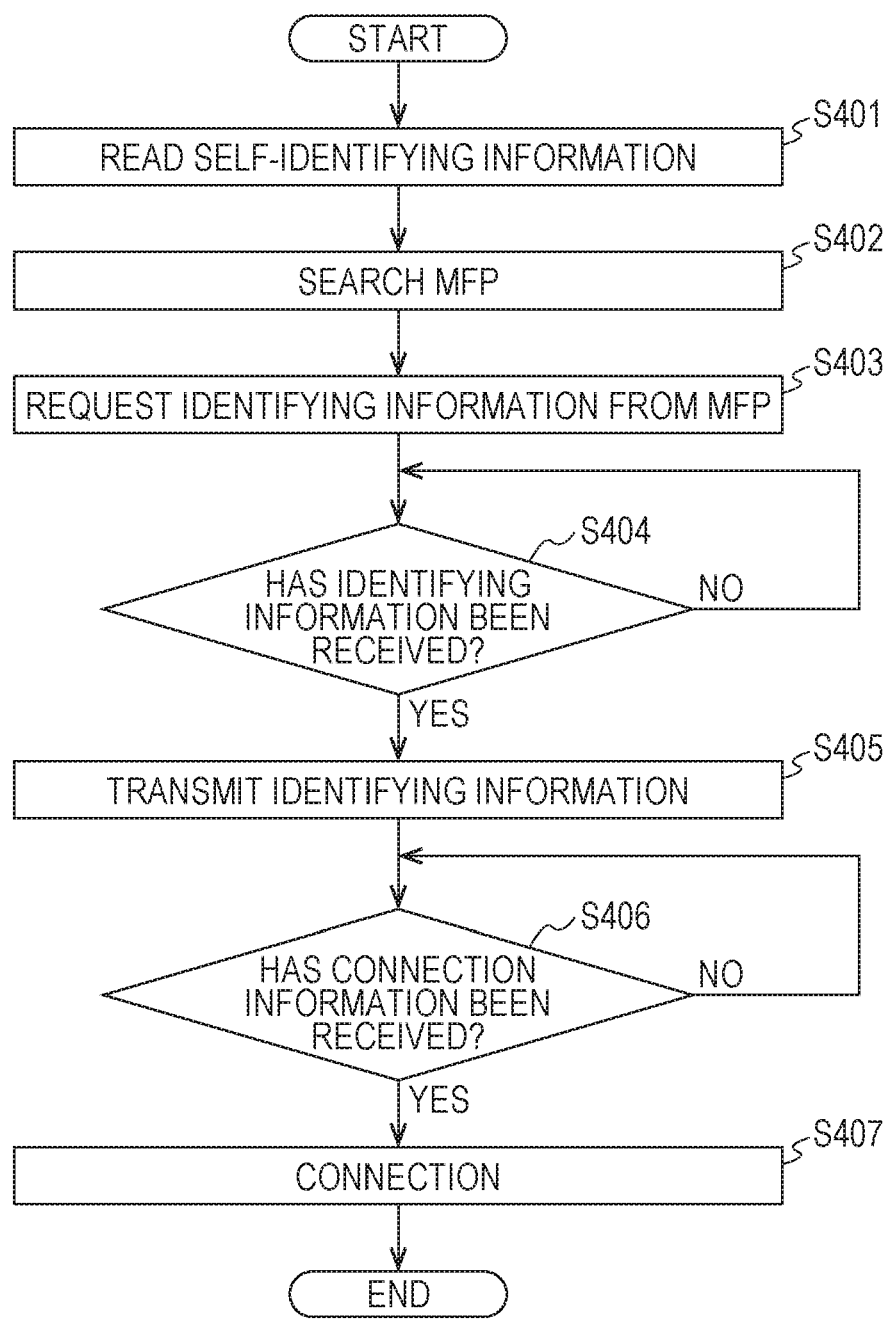
FIG. 4 is an exemplary flow chart of setup operation of the gateway.

As illustrated in FIG. 4, upon the setup, the gateway 150 first reads the identifying information of the gateway 150 itself from the self-identifying information storage unit 301 (S401). Next, the MFP searching unit 305 searches the MFP 170 that has been connected to the LAN 160 (S402). The MFP identifying information acquisition unit 306 requests the identifying information from the MFP 170 that has been detected (S403).

After the MFP identifying information acquisition unit 306 acquires the identifying information from the MFP 170 (S404: YES), the identifying information transmitter 302 transmits the identifying information of the gateway 150 itself and the identifying information of the MFP 170 to the customer management server 100 (S405). After that, after the connection information receiver 303 receives the connection information from the customer management server 100 (S406: YES), the connection processing unit 304 establishes the continuous connection with the continuous connection server 110 (S407).

(3) Configurations and Operation of Customer Management Server 100

Next, configurations of the customer management server 100 will be described.

(3-1) Hardware Configuration

First, a hardware configuration of the customer management server 100 will be described.

Figure 5:
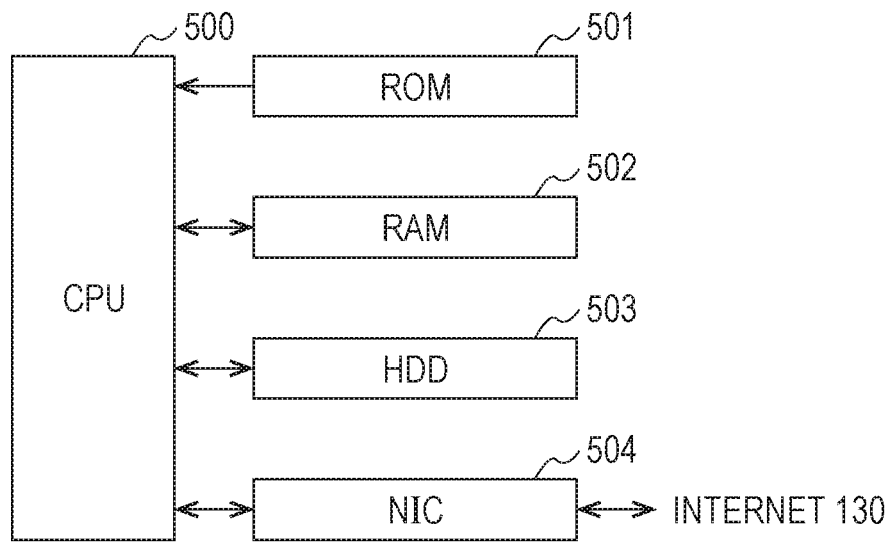
FIG. 5 is an exemplary block diagram of a hardware configuration of a customer management server.

As illustrated in FIG. 5, the customer management server 100 includes, for example, a central processing unit (CPU) 500, a read only memory (ROM) 501, and a random access memory (RAM) 502. When power is supplied to the customer management server 100, the CPU 500 reads a boot program from the ROM 501 so as to boot.

After that, the CPU 500 reads and executes an operating system (OS) and a management program from a hard disk drive (HDD) 503 so as to manage setup processing of the gateway 150.

In this case, the customer management server 100 uses a network interface card (NIC) 504 so as to communicate with other devices via the Internet 130.

(3-2) Functional Configuration

Next, a functional configuration of the customer management server 100 will be described by particularly focusing on management of the setup processing of the gateway 150.

Figure 6:
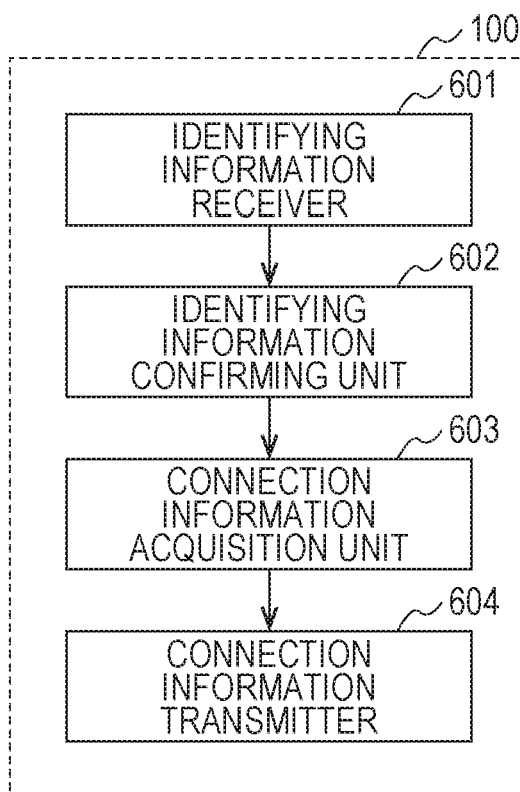
FIG. 6 is an exemplary block diagram of a functional configuration of the customer management server.

As illustrated in FIG. 6, the customer management server 100 includes functions, for example, an identifying information receiver 601 and an identifying information confirming unit 602. The identifying information receiver 601 receives, from the gateway 150, the identifying information of the gateway 150 itself and the identifying information of the MFP 170, having been acquired by the gateway 150.

When the identifying information receiver 601 receives the identifying information of the gateway 150 itself and the identifying information of the MFP 170 from the gateway 150, the identifying information confirming unit 602 reads confirming information from the sales management DB 101 using the identifying information of the gateway 150 as a key. In a case where the gateway 150 has been connected to the LAN 160 to be connected to the gateway 150, the confirming information is the identifying information of the MFP 170, the identifying information to be acquired by the gateway 150.

The identifying information confirming unit 602 verifies and confirms whether the confirming information and the identifying information of the MFP 170 correspond to each other, the identifying information having been received from the gateway 150. Accordingly, it is determined whether the gateway 150 has been connected to the LAN 160 as contracted. That is, correctness of an installation location of the gateway 150 is automatically determined.

Upon the determination of the correctness, there is no need for, upon the setup, input work of a tenant ID by a user (customer) of the gateway 150 or a service man dispatched from a vendor of the gateway 150. Note that, for example, when the gateway 150 is shipped, the identifying information of the gateway 150 and the identifying information of the MFP 170 have been registered in the sales management DB 101 prior to the setup of the gateway 150.

In a case where the identifying information confirming unit 602 confirms the correctness of the installation location of the gateway 150, a connection information acquisition unit 603 reads, from the connection management DB 102, the connection information of the gateway 150 with the identifying information of the gateway 150 as a key. In a case where the gateway 150 is an object to be provided with the App service, the connection information can be read. In a case where the gateway 150 is not an object to be provided with the App service, since the connection information has not been registered, the connection information cannot be read. Accordingly, it is confirmed whether the user of the gateway 150 meets a user of the App service.

Therefore, unlike the technique in the related art, time and labor necessary for the user of the gateway 150 to acquire the activation key and set the activation key in the gateway 150, can be omitted.

Note that, in a case where the connection management DB 102 confirms that the confirming information and the identifying information of the MFP 170, having been received from the gateway 150, correspond to each other, the connection management DB 102 may generate an ID and a password for logging in the continuous connection server 110 by using any one or both of the tenant ID corresponding to the gateway 150 and the identifying information of the gateway 150. Prior to the setup of the gateway 150, for example, the ID and the password may be generated when the gateway 150 is shipped.

Prior to the setup of the gateway 150, the tenant ID and a connection destination URL included in the connection information are registered in the connection management DB 102. The connection management DB 102 may store an activation state of the gateway 150, namely, whether the setup of the gateway 150 has been completed. Before the setup is completed, the activation state is stored as "not-yet".

A connection information transmitter 604 transmits the connection information acquired by the connection information acquisition unit 603, to the gateway 150.

(3-3) Management Operation

Next, setup management operation of the customer management server 100 will be described.

Figure 7:
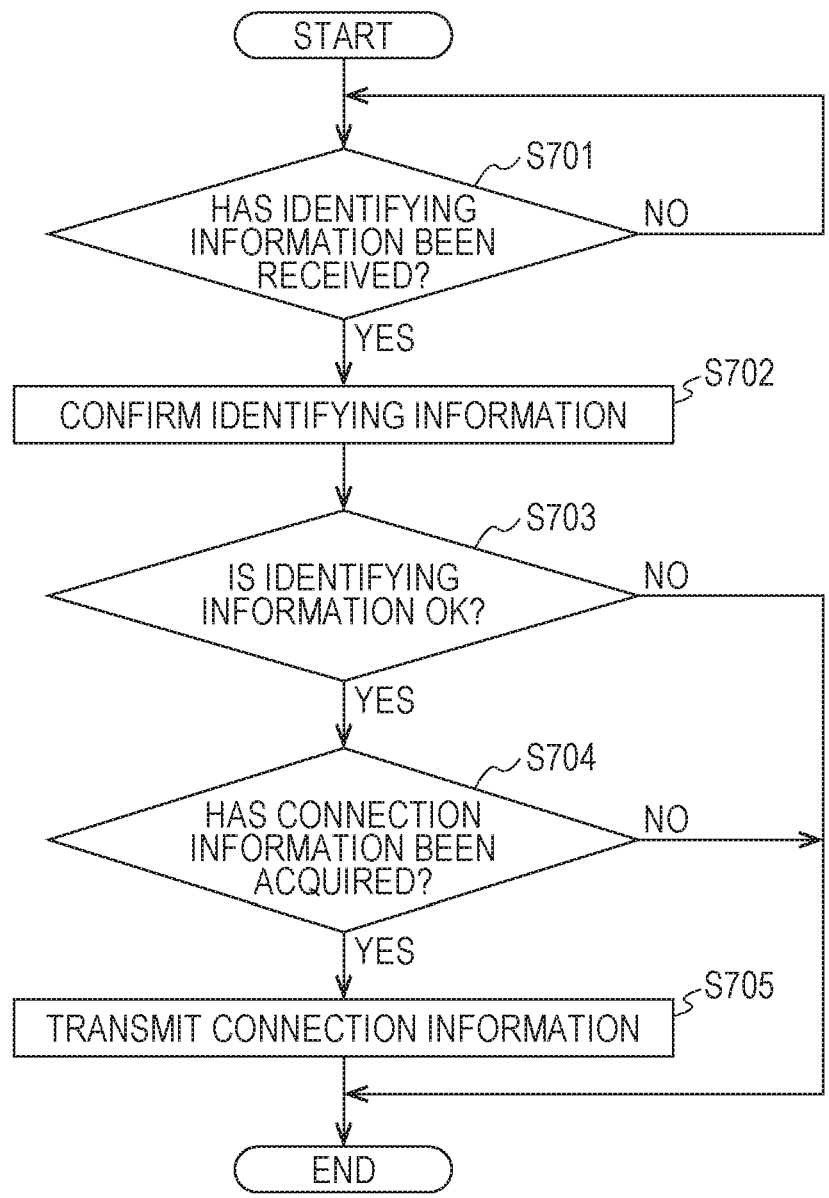
FIG. 7 is an exemplary flow chart of setup management operation of the customer management server.

As illustrated in FIG. 7, in the customer management server 100, when the identifying information receiver 601 receives the identifying information from the gateway 150 (S701: YES), the identifying information confirming unit 602 reads and verifies the confirming information from the sales management DB 101 with the identifying information of the gateway 150 as a key (S702).

As a result, when the identifying information and the confirming information correspond to each other (S703: YES), the connection information acquisition unit 603 uses the identifying information of the gateway 150 as the key so as to acquire the connection information from the connection management DB 102. When the acquisition of the connection information succeeds (S704: YES), the connection information transmitter 604 transmits the connection information to the gateway 150 (S705). After that, the setup management operation is completed.

Note that when the identifying information and the confirming information do not correspond to each other (S703: NO) or the acquisition of the connection information fails (S704: NO), the gateway 150 may be notified of the result.

Figure 8:
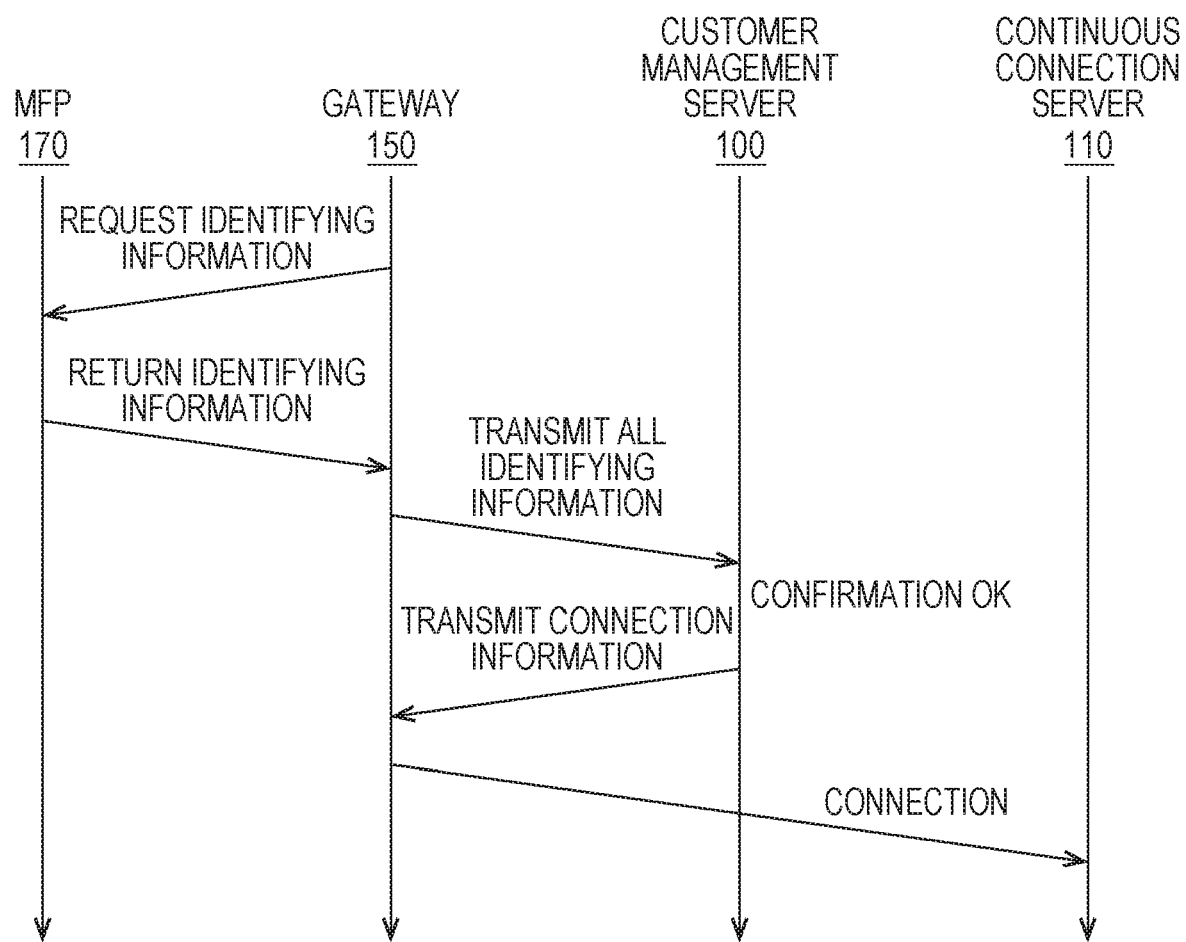
FIG. 8 is an exemplary sequence diagram of cooperative operation between the customer management server, a continuous connection server, the gateway, and an MFP, upon a setup of the gateway.

FIG. 8 is a sequence diagram of cooperative operation between the customer management server 100, the continuous connection server 110, the gateway 150, and the MFP 170, upon the setup of the gateway 150. As illustrated in FIG. 8, when starting setup processing, the gateway 150 first requests the identifying information from the MFP 170. After receiving a response of the identifying information from the MFP 170, the gateway 150 transmits the identifying information of the gateway 150 itself and the identifying information of the MFP 170 to the customer management server 100.

When receiving the identifying information of the gateway 150 itself and the identifying information of the MFP 170, the customer management server 100 reads the confirming information from the sales management DB 101 so as to confirm correctness of an installation location of the gateway 150. When it is determined that the installation location is correct, the customer management server 100 reads the connection information from the connection management DB and transmits the connection information to the gateway 150. The gateway 150 that has received the connection information uses the connection information so as to connect to the continuous connection server 110.

Accordingly, upon the setup of the gateway 150, there is no need for notifying the user of the gateway 150 of information, such as the tenant ID and an activation key. A possibility that the information accompanied with the notification leaks out to a third party, can be avoided. When the gateway 150 is installed, setup operation by manpower is omitted. Therefore, installation costs can be reduced in terms of omission of work by the user or the service man.

[2] Second Embodiment

Next, a second embodiment of the present invention will be described. A communication mediation system according the second embodiment performs operation similar to that of the communication mediation system according to the above first embodiment. Meanwhile, there is a difference in a point in which a gateway confirms propriety of a serial number. The descriptions will be given below by mainly focusing on the difference.

Note that the same members between the embodiment and a modification are denoted with the same reference signs.

(1) Configuration and Operation of Gateway 150

First, a configuration and operation of a gateway 150 according to the present embodiment will be described.

The gateway 150 according to the present embodiment includes a hardware configuration similar to that of the gateway 150 according to the above first embodiment. Thus, the description of the hardware configuration will be omitted.

(1-1) Functional Configuration

A functional configuration of the gateway 150, in particular, a function of setup processing will be described.

Figure 9:
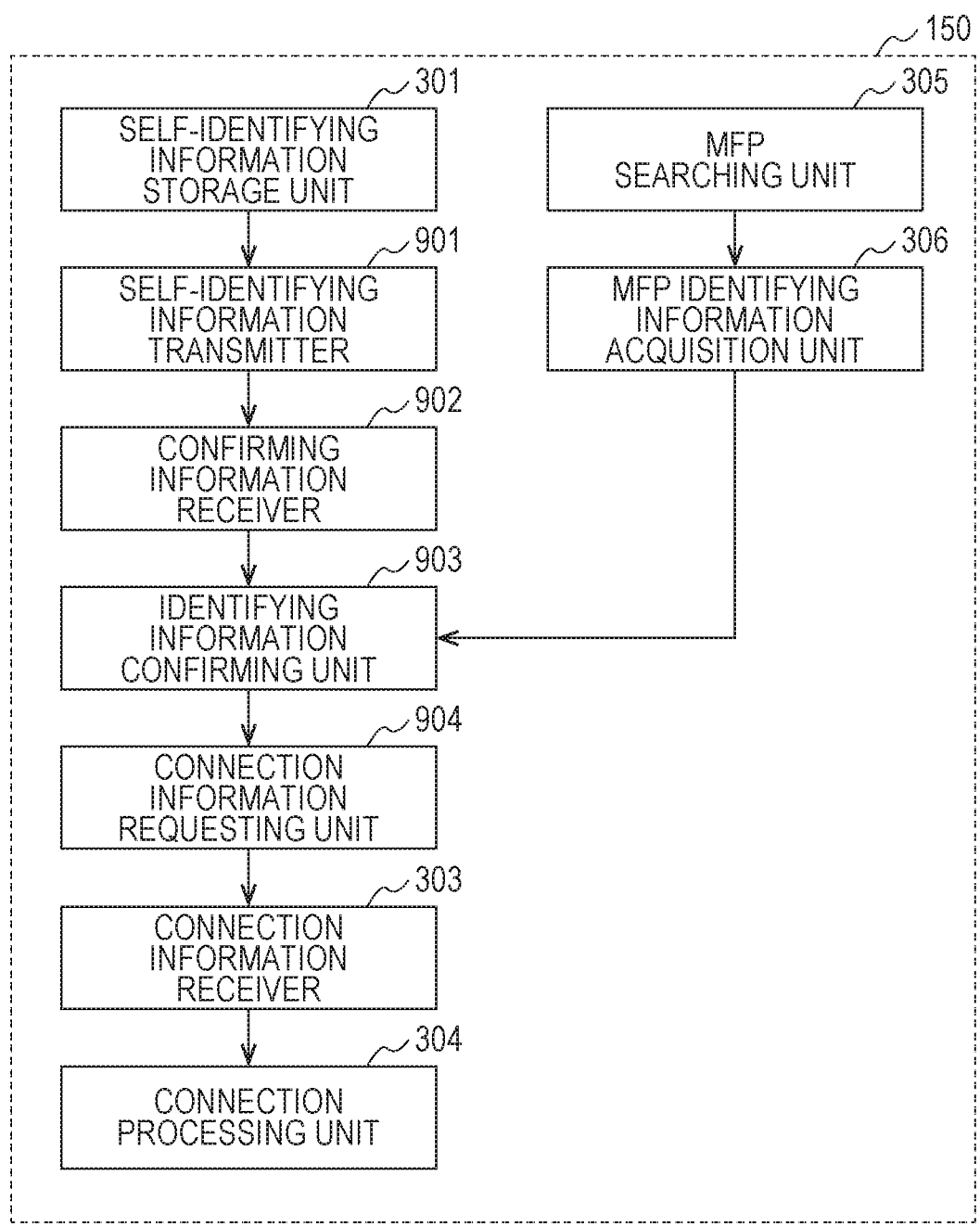
FIG. 9 is an exemplary block diagram of functional operation of the gateway.

As illustrated in FIG. 9, the gateway 150 includes functions, such as a self-identifying information storage unit 301 and a self-identifying information transmitter 901. Note that the descriptions of the self-identifying information storage unit 301, a connection information receiver 303, a connection processing unit 304, an MFP searching unit 305, and an MFP identifying information acquisition unit 306 are similar to those according to the above first embodiment. Thus, the descriptions will be omitted.

A self-identifying information transmitter 901 transmits identifying information of the gateway 150 itself to a customer management server 100, the identifying information having been stored in the self-identifying information storage unit 301.

A confirming information receiver 902 receives, from a customer management server 100, confirming information for confirming identifying information of an MFP 170, the identifying information being acquired by the MFP identifying information acquisition unit 306.

An identifying information confirming unit 903 verifies the confirming information received by the confirming information receiver 902 from the customer management server 100, and the identifying information of the MFP 170 so as to confirm whether the confirming information and the identifying information of the MFP 170 correspond to each other. According to the above first embodiment, this is the processing performed by the identifying information confirming unit 602 of the customer management server 100.

After the identifying information confirming unit 903 confirms that the identifying information of the MFP 170 and the confirming information correspond to each other, a connection information requesting unit 904 notifies the customer management server 100 of the result of the correspondence, and requests connection information necessary for connecting the gateway 150 to a continuous connection server 110.

(1-2) Setup Operation

Next, setup operation of the gateway 150 will be described.

Figure 10:
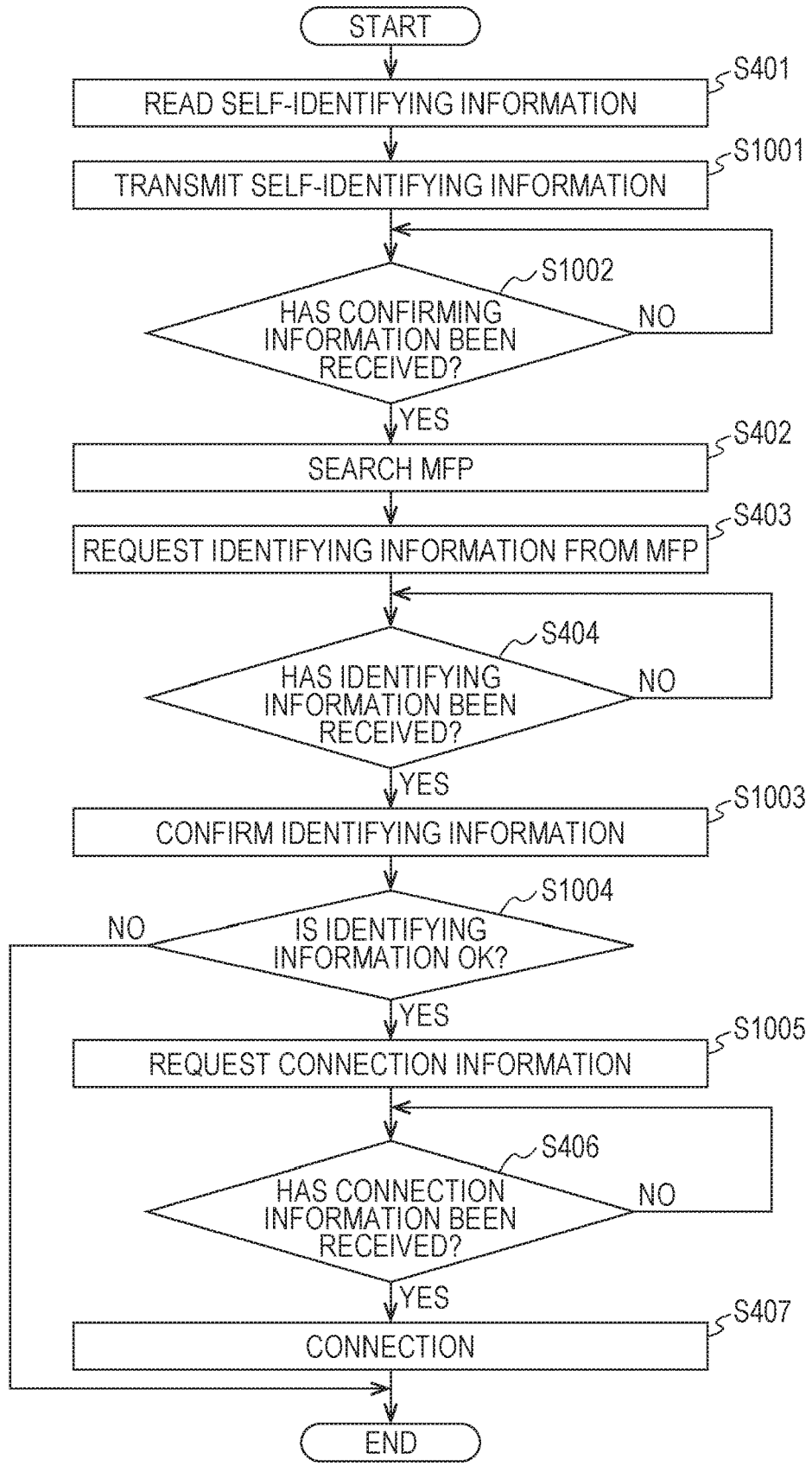
FIG. 10 is an exemplary flow chart of setup operation of the gateway.

As illustrated in FIG. 10, upon a setup, the gateway 150 reads the identifying information of the gateway 150 itself from the self-identifying information storage unit 301 (S401). The self-identifying information transmitter 901 transmits the identifying information of the gateway 150 itself to the customer management server 100 (S1001). After the confirming information receiver 902 receives the confirming information from the customer management server 100 (S1002: YES), the MFP searching unit 305 searches the MFP 170 that has been connected to a LAN 160 (S402).

When the MFP 170 is detected, the MFP identifying information acquisition unit 306 requests the identifying information (S403). When the MFP identifying information acquisition unit 306 receives the identifying information from the MFP 170 (S404: YES), the identifying information confirming unit 903 verifies the confirming information received from the customer management server 100 and the identifying information received from the MFP 170 so as to confirm whether the confirming information and the identifying information correspond to each other (S1003). When the confirming information and the identifying information correspond to each other (S1004: YES), the connection information requesting unit 904 requests the connection information from the customer management server 100 (S1005).

After that, the connection information receiver 303 receives the connection information from the customer management server 100 (S406: YES), the connection processing unit 304 connects the MFP 170 to the continuous connection server 110 (S407).

(2) Configuration and Operation of Customer Management Server 100

Next, a configuration and operation of the customer management server 100 will be described.

The customer management server 100 according to the present embodiment includes a hardware configuration similar to that of the customer management server 100 according to the above first embodiment. Thus, the description of the hardware configuration will be omitted.

(2-1) Functional Configuration

First, a functional configuration of the customer management server 100 regarding management of the setup processing of the gateway 150, will be described.

Figure 11:
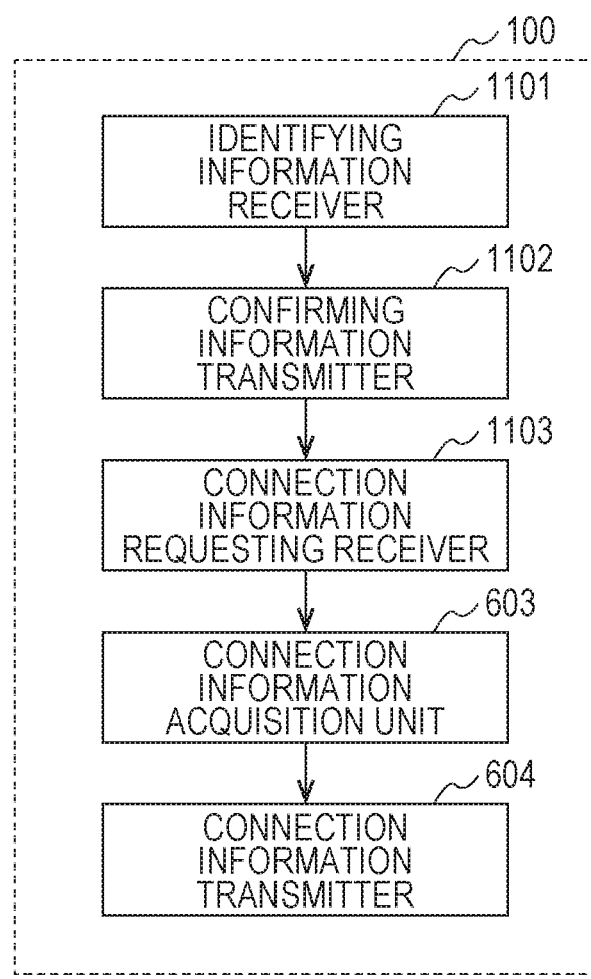
FIG. 11 is an exemplary block diagram of functional configuration of the customer management server.

As illustrated in FIG. 11, the customer management server 100 includes functions, for example, an identifying information receiver 1101 and a confirming information transmitter 1102 The identifying information receiver 1101 receives the identifying information of the gateway 150 itself from the gateway 150.

When the identifying information receiver 1101 receives the identifying information of the gateway 150, the confirming information transmitter 1102 reads the confirming information from a sales management DB 101, with the identifying information of the gateway 150 as a key, so as to transmit the confirming information to the gateway 150.

A connection information requesting receiver 1103 receives, from the gateway 150, a request for the connection information. A connection information acquisition unit 603 and a connection information transmitter 604 are similar to those according to the above first embodiment.

(2-2) Management Operation

Next, setup management operation of the customer management server 100 will be described.

Figure 12:
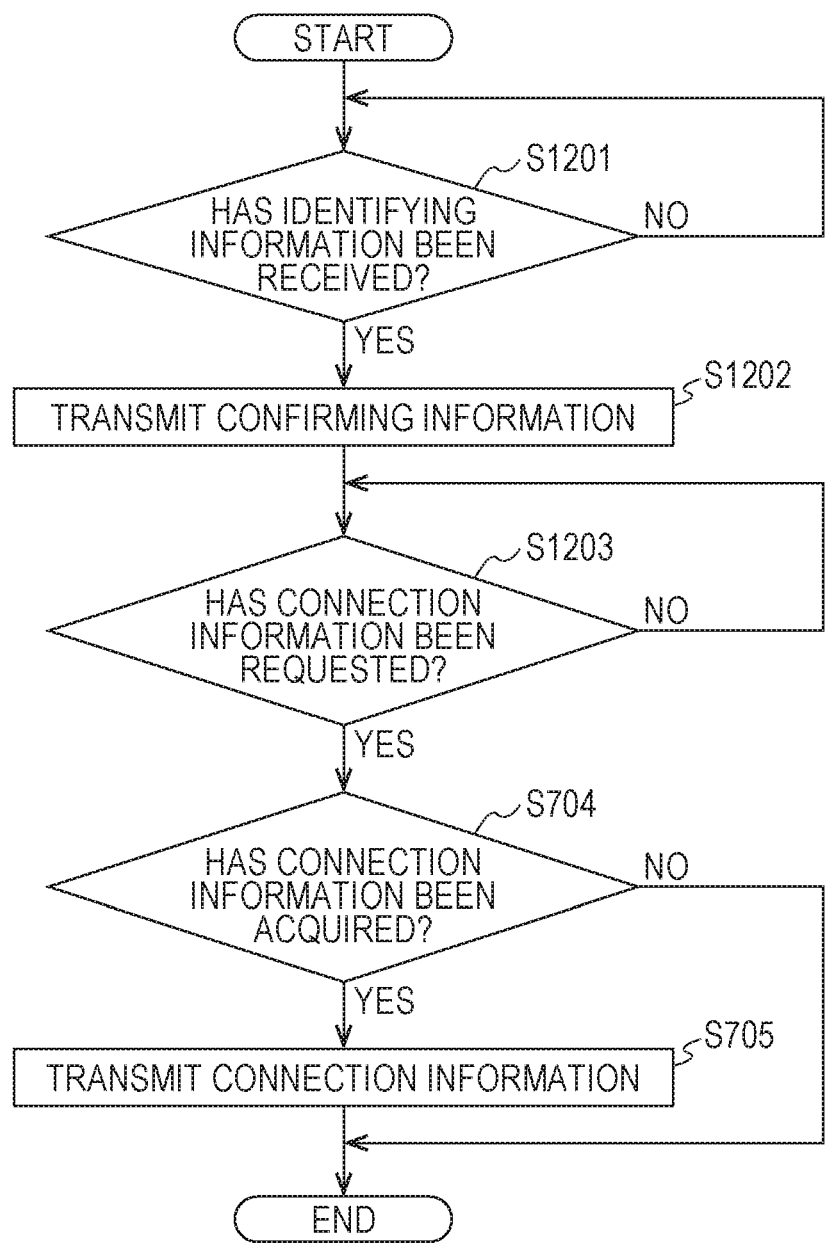
FIG. 12 is an exemplary flow chart of setup management operation of the customer management server.

As illustrated in FIG. 12, in the customer management server 100, when the identifying information receiver 1101 receives the identifying information of the gateway 150 (S1201: Yes), the confirming information transmitter 1102 reads the confirming information from the sales management DB 101 with the identifying information of the gateway 150 as a key so as to transmit the confirming information to the gateway 150 (S1202).

After that, after the connection information requesting receiver 1103 receives, from the gateway 150, a request for the connection information, accompanied with notification of the result that the identifying information of the MFP 170 and the confirming information correspond to each other (S1203: YES), the connection information acquisition unit 603 acquires the connection information from the connection management DB 102.

In this case, the identifying information receiver 1101 may store the identifying information received from the gateway 150. With the identifying information as a key, the connection information acquisition unit 603 may read the connection information from the connection management DB 102. Upon a request for the connection information by the gateway 150, the customer management server 100 may be also notified of the identifying information of the gateway 150.

When the acquisition of the connection information succeeds (S704: YES), the connection information transmitter 604 transmits the connection information to the gateway 150 (S705). After that, the setup management operation is completed. When the acquisition of the connection information fails (S704: NO), the gateway 150 may be notified of the result.

Figure 13:
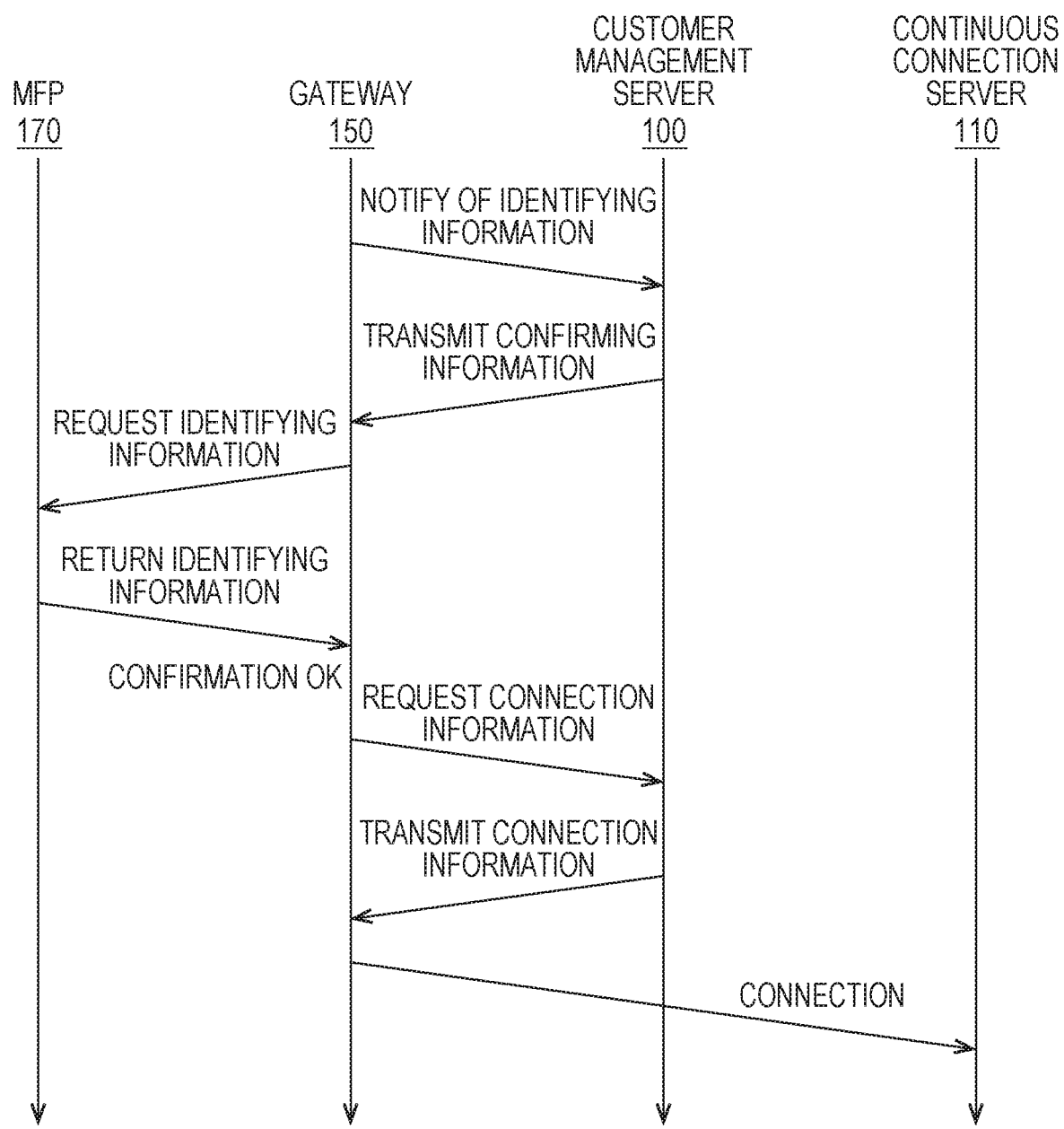
FIG. 13 is an exemplary sequence diagram of cooperative operation between the customer management server, the continuous connection server, the gateway, and the MFP, upon a setup of the gateway.
Figure 14:
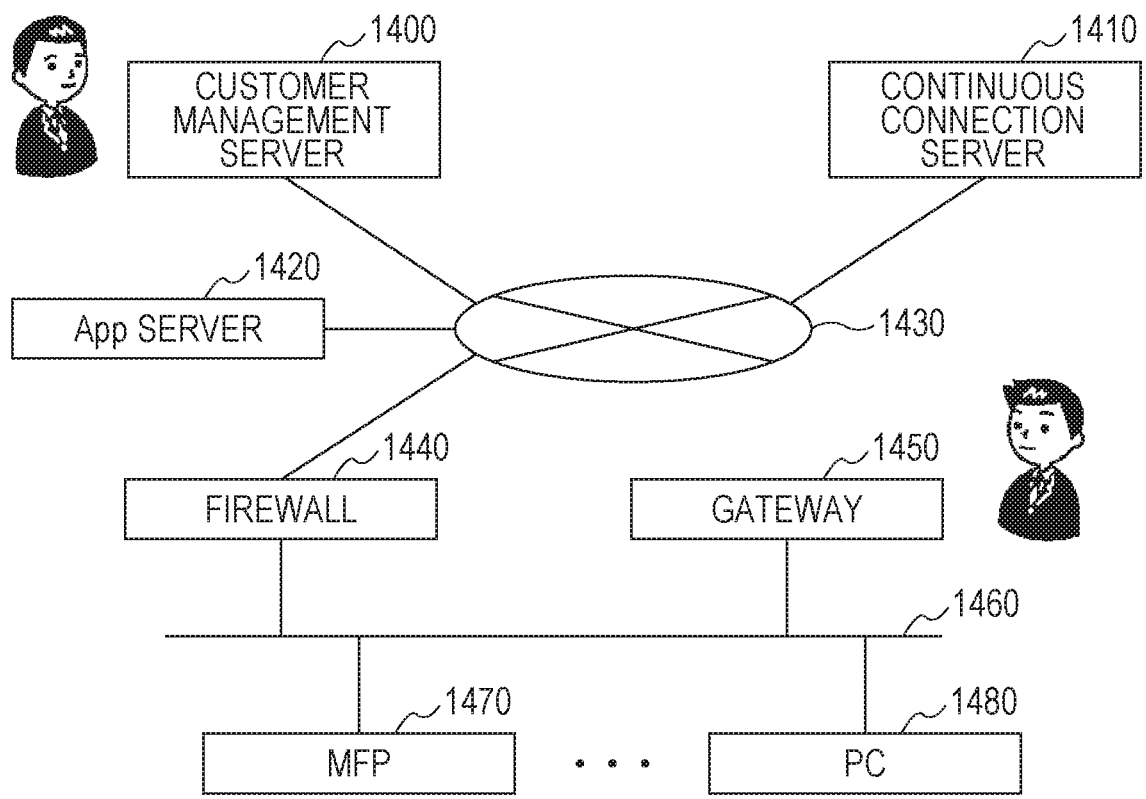
FIG. 14 is a diagram for describing a technique in the related art.

FIG. 13 is a sequence diagram of cooperative operation between the customer management server 100, the continuous connection server 110, the gateway 150, and the MFP 170, upon the setup of the gateway 150. As illustrated in FIG. 13, when starting setup processing, the gateway 150 first notifies the customer management server 100 of the identifying information of the gateway 150 itself. In response to this, when the customer management server 100 transmits the confirming information to the gateway 150, the gateway 150 requests the identifying information from the MFP 170.

The MFP 170 returns the identifying information to the gateway 150. The gateway 150 verifies the identifying information received from the MFP 170 and the confirming information received from the customer management server 100. When confirming correspondence between the identifying information and the confirming information, the gateway 150 requests the connection information from the customer management server 100. When the customer management server 100 transmits the connection information to the gateway 150, the gateway 150 uses the connection information that has been received so as to perform continuous connection with the continuous connection server 110.

As described above, an effect similar to that according to the first embodiment can be also acquired.

[3] Modification

The embodiments of the present invention have been described above. The present invention is not limited to the above embodiments. The following modification can be performed.

(1) The above embodiments have been described with an example in which the gateway 150 acquires the identifying information of the MFP 170. Needless to say, the present invention is not limited to this. Instead of this, the customer management server 100 may acquire the identifying information of the MFP 170 without depending on the gateway 150. As described above, correctness of an installation location of the gateway 150 can be confirmed with high precision.

In this case, a range of the MFP 170 can be designated by a subnet mask or a default gateway, the range from which the customer management server 100 acquires the identifying information.

Note that, the customer management server 100 may verify confirming information and the identifying information of the MFP 170 acquired by the customer management server 100 without depending on the gateway 150. The customer management server 100 may transmit the identifying information and the confirming information to the gateway 150 so that the gateway 150 may verify the identifying information and the confirming information.

The customer management server 100 may verify the identifying information of the MFP 170 acquired without depending on the gateway 150 and the identifying information of the MFP 170 acquired by the gateway 150. Only in a case where the identifying information of the MFP 170 acquired without depending on the gateway 150 and the identifying information of the MFP 170 acquired by the gateway 150, correspond to each other, the customer management server 100 may verify the identifying information and the confirming information. As described above, the correctness of the installation location of the gateway 150 can be further securely confirmed.

(2) The above embodiments have been described with an example in which the gateway 150 determines whether each of the devices is applicable to the object with the identifying information to be acquired based on the manufacturer information of each of the devices, the manufacturer information being acquired by using the SNMP. The present invention is not limited to this. Instead of this, the following may be performed.

That is, prior to a search for the MFP 170, the gateway 150 may transmit the identifying information of the gateway 150 itself to the customer management server 100. The gateway 150 may acquire a type of the MFP 170 from the customer management server 100 and then acquire the identifying information from only the MFP 170 applicable to the type. For example, the SNMP acquires the type of the MFP 170 so that it can be confirmed whether the MFP 170 is applicable to the type.

As described above, in a case where a large number of MFPs 170 have been connected to the LAN 160 to which the gateway 150 has been connected, the number of MFPs 170 from which the identifying information is collected can be narrowed down. Therefore, time necessary for setting up the gateway 150 can be shortened.

Note that, the type of the MFP 170 includes a kind of option that has been added to the MFP 170 in addition to a model of the MFP 170 body.

(3) The above embodiments have been described with an example in which the gateway 150 acquires the identifying information of the MFP 170 connected to the LAN 160. Needless to say, the present invention is not limited to this. The identifying information may be acquired from other devices together with the MFP 170 or instead of the MFP 170. Information on which device the identifying information is acquired from, may be previously set in the gateway 150. The gateway 150 may inquire of the customer management server 100 about the information.

The devices other than the MFP 170 may be, for example, a printer, a copying machine having a scanner, and a facsimile machine having a communication function. The devices may be a device, such as a personal computer 180 other than an image forming apparatus.

(4) According to the above embodiments, not particularly limited, in addition to a case where the gateway 150 is connected to the LAN 160 for the first time after the shipment, the gateway 150 may also perform the setup processing in a case where the gateway 150 is connected to a new LAN 160 by, for example, replacement for failure.

(5) The above embodiments has been described with an example in which the product number for identifying each of the gateway 150 and the MFP 170, and the serial number for identifying each of the products of the same model are used as the identifying information. Needless to say, the present invention is not limited to this. Instead of this, the following may be performed.

For example, only the serial number may be used as the identifying information. Information that can individually specify devices applicable to an object with the identifying information to be acquired may be used as the identifying information other than the serial number.

(6) The above embodiments have been described with an example in which the confirming information is the identifying information of the MFP 170, the identifying information to be acquired by the gateway 150, in a case where the gateway 150 has been connected to the LAN 160 to be connected to the gateway 150. Needless to say, the present invention is not limited to this. Instead of the identifying information of the MFP 170, the identifying information to be acquired by the gateway 150, a calculation value uniquely calculated from the identifying information, such as a hash value calculated from the identifying information, may be used.

In this case, a calculation value calculated from the identifying information acquired by the gateway 150 is an object to be verified.

(7) The embodiments have been described with an example in which the customer management server 100 is a single server device. Needless to say, the present invention is not limited to this. The customer management server 100 may be a cloud system including a plurality of computers. Each of the continuous connection server 110 and the App server 120 may be also a single server device or a cloud system.

(8) The above embodiments have been described with an example in which the gateway 150 is used as an example of the communication mediation device. Needless to say, the present invention can be understood that communication mediation processing to be performed by the gateway 150 is a communication mediation program to be executed by a CPU 200 that controls the gateway 150.

A communication mediation system, a communication mediation device, a communication mediation method, and a communication mediation program according to the present invention, are useful as a technique that securely introduces the communication mediation device with less time and labor.

According to an embodiment of the present invention, setting information is automatically sent to the communication mediation device without requiring manpower. Therefore, a possibility that the tenant ID and the activation key leak out can be avoided. The security accompanied with the setup can be protected, and time and labor necessary for the setup can be also reduced.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A management device connected to the Internet, the management device comprising:
   a first transmitting unit configured to transmit, to a communication mediation device connected to a LAN, setting information necessary for mediating communication from the Internet to at least one terminal device connected to the LAN;
   a storage unit configured to store determining information for determining whether the communication mediation device has been connected to an appropriate LAN, the determining information comprising identifying information of a predetermined terminal device from among the at least one terminal device connected to the LAN;
   a receiving unit configured to receive, from the communication mediation device, identifying information of the communication mediation device and the identifying information of the predetermined terminal device;
   a confirming unit configured to read the determining information from a database using the received identifying information of the communication mediation device as a key; and
   a determining unit configured to determine whether the communication mediation device has been connected to the appropriate LAN, by confirming whether the received identifying information of the predetermined terminal device and the determining information read from the database correspond to each other,
   wherein the first transmitting unit transmits the setting information in a case where it has been determined that the communication mediation device has been connected to the appropriate LAN.

2. The management device according to claim 1, further comprising a designating information storage unit configured to store designating information for designating the predetermined terminal device.

3. The management device according to claim 1, wherein the identifying information of the communication mediation device and the identifying information of the predetermined terminal device are registered in the database before the communication mediation device is connected to the LAN.

4. A communication mediation system comprising:
   the management device of claim 1;
   the communication mediation device connected to the LAN; and
   the at least one terminal device connected to the LAN,
   wherein the communication mediation device includes:
      an acquisition unit configured to acquire the identifying information of the predetermined terminal device from among the at least one terminal device connected to the LAN; and
      a second transmitting unit configured to transmit the identifying information of the predetermined terminal device to the management device.

5. A communication mediation system comprising:
   a management device;
   a communication mediation device connected to a LAN; and
   at least one terminal device connected to the LAN,
   wherein the communication mediation device includes:
      an acquisition unit configured to acquire the identifying information of the predetermined terminal device from among the at least one terminal connected to the LAN;
      a receiving unit configured to receive determining information from the management device, the determining information including the identifying information of the predetermined terminal device;
      a determining unit configured to determine whether the communication mediation device has been connected to the appropriate LAN, by confirming whether the acquired identifying information of the predetermined terminal device corresponds to the received determining information; and a notifying unit configured to notify the management device that it has been determined that the communication mediation device has been connected to the appropriate LAN, and wherein the management device includes:
a confirming unit that reads the determining information from a database using identifying information of the communication mediation device as a key; and
a second transmitting unit configured to transmit the read determining information to the communication mediation device.

6. The communication mediation system according to claim 5, wherein:
the communication mediation device further includes a third transmitting unit configured to transmit the identifying information of the communication mediation device, to the management device, and
the management device further includes a second receiving unit configured to receive the identifying information of the communication mediation device from the communication mediation device.

7. The communication mediation system according to claim 4, wherein:
the communication mediation device further includes a third transmitting unit configured to transmit the identifying information of the communication mediation device, to the management device, and
the management device further includes a second receiving unit configured to receive the identifying information of the communication mediation device from the communication mediation device.

8. A communication mediation system comprising:
the management device of claim 1;
the communication mediation device connected to the LAN;
the at least one terminal device connected to the LAN; and
a connection device connected to the Internet, the connection device being connected to the communication mediation device with the setting information before mediating the communication, the connection device being configured to receive, from the Internet, a request for connection to the terminal device, and the connection device being configured to request the communication mediation device to mediate the communication, wherein the communication mediation device includes:
a receiving unit configured to receive the request for mediation from the connection device; and
an establishing unit configured to establish a communication route between the Internet and the at least one terminal device connected to the LAN in accordance with the request for mediation.

9. The communication mediation system according to claim 8, wherein the LAN has been connected to the Internet via a firewall, and the communication route is a tunneling route established over the firewall.

10. A non-transitory recording medium storing a computer readable program that is executable by a computer of a management device connected to the Internet, the management device comprising a storage unit configured to store determining information for determining whether a communication mediation device connected to a LAN has been connected to an appropriate LAN, the determining information comprising identifying information of a predetermined terminal device from among at least one terminal device connected to the LAN, and the program controlling the computer to execute processing comprising:
receiving, from the communication mediation device, identifying information of the communication mediation device and the identifying information of the predetermined terminal device;
reading the determining information from a database using the received identifying information of the communication mediation device as a key;
determining whether the communication mediation device has been connected to the appropriate LAN, by confirming whether the received identifying information of the predetermined terminal device and the determining information read from the database correspond to each other; and
transmitting, to the communication mediation device, setting information necessary for mediating communication from the Internet to the at least one terminal device, in a case where it has been determined that the communication mediation device has been connected to the appropriate LAN.

* * * * *